United States Patent [19]
Berger

[11] 3,761,926
[45] Sept. 25, 1973

[54] METHOD AND APPARATUS FOR IMPROVING THE ACCURACY OF DOPPLER VELOCITY MEASUREMENT OVER THE SEA

[75] Inventor: France B. Berger, North Haledon, N.J.

[73] Assignee: The Singer Company, Little Falls, N.J.

[22] Filed: Dec. 21, 1971

[21] Appl. No.: 210,352

[52] U.S. Cl. ................................................. 343/9
[51] Int. Cl. .............................................. G01s 9/46
[58] Field of Search .................................... 343/8, 9

[56] References Cited
UNITED STATES PATENTS

| | | | |
|---|---|---|---|
| 3,023,407 | 2/1962 | Basim et al. | 343/9 X |
| 3,044,059 | 7/1962 | Belchis | 343/8 |
| 3,235,865 | 2/1966 | Flower et al. | 343/8 |
| 3,343,161 | 9/1967 | Billottet | 343/9 X |
| 3,480,954 | 11/1969 | Gray et al. | 343/9 X |

Primary Examiner—T. H. Tubbesing
Attorney—S. A. Giarratana et al.

[57] ABSTRACT

Velocity readings of airborne Doppler radar over water generally yield a value different from that obtained over land. These values include a component known as an "over water shift" and another component referred to as the "water motion effect." These components differ in various radar systems depending upon such variables as the frequency and polarization of the transmitted electromagnetic signal, and the angle with respect to the horizontal axis of the beam of radiation formed by the antenna, i.e., the "looking angle" of the antenna. Substantially, true velocity of an aircraft above water with respect to ground is measurable through the utilization of a radar system with two operation modes; one having at least one of the above variables different from the other. Each mode provides a different apparent velocity from the other. The apparent velocities of the two modes are combined in such a manner as to produce a true velocity based upon the known relationships of the various parameters and the apparent velocities.

13 Claims, 7 Drawing Figures

Patented Sept. 25, 1973 3,761,926

INVENTOR.
FRANCE B. BERGER
BY S.A. CIARRATANA
T.W. KENNEDY
ATTORNEYS

FIG. 6

Patented Sept. 25, 1973

3,761,926

5 Sheets-Sheet

FIG. 7

INVENTOR.
FRANCE B. BERGER

BY S.A. GIARRATANA
T.W. KENNEDY
ATTORNEYS

METHOD AND APPARATUS FOR IMPROVING THE ACCURACY OF DOPPLER VELOCITY MEASUREMENT OVER THE SEA

BACKGROUND OF THE INVENTION

This invention relates generally to methods of and apparatus for the Doppler measurement of velocity of an aircraft with respect to earth, and, in particular, to the measurement of the velocity of an aircraft above water with respect to ground. Accordingly, the general objects of the invention are to provide new and improved methods and apparatus of such character.

Since Doppler radar information generated by an aircraft radar system is derived from signals back-scattered from earth, the radar fundamentally measures velocity relative to the objects which scatter the radiation. In the case of the sea, the scatterers are ripples, small waves, crests of large waves, droplets, and foam. The magnitude of this water motion effect, equivalent to the effective mean speed of the scatterers, is frequently three or four knots and maybe severalfold greater on occasion. Wing Commander D. F. H. Grocott discusses such an effect in an article entitled *Doppler Correction for Surface Movement* published in the British *Journal of the Institute of Navigation*, Volume 16, Jan. 1963. This effect will result, therefore, in a system velocity error of ½ to 1 percent or greater. When this is compared to present day, high performance Doppler radar specification requirements of around 0.1 percent, it is seen that the error due to water motion effect alone would make the Doppler system much less satisfactory while operating over bodies of water.

The reader is respectfully directed to various publications relating to Doppler velocity measurement which have been authored by the applicant; namely (1) *The Nature of Doppler Velocity Measurement*, IRE Transactions on Aeronautical and Navigational Electronics, Sept., 1957, pp. 103–112; and (2) *The Design of Airborne Doppler Velocity Measuring Systems*, IRE Transactions on Aeronautical and Navigational Electronics, Dec., 1957, pp. 157–175.

Note, as set forth in the second column of page 161 of publication (2), that there appeared, at that time, to be no practical measures which a system designer could take to avoid such errors.

Various possible technical solutions to the water motion problem have been considered.

One possible "solution" was adopted wherein a computer was designed such that a water motion vector could be manually added to the Doppler velocity output by setting dials. One would estimate what to set in based on surface wind independently provided or approximated from Doppler and air vector measured wind at altitude. Technically, this is considered to be a poor approach and would be unacceptable operationally for modern use.

Where a Doppler inertial system is being utilized another approach for determining water motion correction is available. This would involve noting overland state variables for the system, and then considering the inertial system as providing a short term reference against which the Doppler is compared as the aircraft performs some maneuver involving different headings. The data obtained can be processed to determine both water motion and water bias corrections. Objectionally, however, the requisite data processing requires sophisticated filtering techniques, wherein water motion components are additional state variables. Further, the approach is time consuming; it requires a maneuver; it is effective only if overland state variables are already determined; and perhaps most significantly, a value determined at one time and place does not, in general, prevail for the entire mission.

The technical solution, which is believed to be the most promising in terms of capability, operational acceptability and cost, is the subject matter of this invention. This approach utilizes unique design concepts, forming the crux of the invention, which flows from empirical flight observations that different Doppler systems yield systematically different values for the effective water motion.

It has been observed that the water motion contribution to the observed ground speed is not, in general, the same for two systems and moreover, that the ratio of such water motion speeds for the two systems tends to be quite constant for a given pair of systems over a range of sea states, operating parameters, and equipment parameters. Based on empirical data collected from various system configurations, it has been observed that the system parameters of "looking" or gamma angle, polarization, and/or operating frequency are directly correlatable to this observed phenomenon wherein the ratio of water motion speed contributions for two systems is a constant. If a Doppler system were designed to operate in two modes which embodied the differences between these certain critical system parameters which result in different water motion speed contributions, then a comparison of the outputs of the two modes could yield an indication of the aircraft's true speed relative to land.

When operating over the sea, it is postulated that the observed ground speed $V_o$ for one mode differs from the true velocity $V$ by an amount $\epsilon V$, where $\epsilon$ is a term proportional to speed known as the "over water calibration shift" and by an incremental speed $s$, due to "the water motion effect." Similarly, for the observed ground speed, $V_o'$, for the other mode. Specifically $V_o = V(1 + \epsilon) + s$ and $V_o' = V(1 + \epsilon') + s'$. The quantities $\epsilon$ and $s$ and $\epsilon'$ and $s'$ are, in general, functions of the sea state, i.e., functions of the velocity of the sea's ripples, waves, droplets, foam and current.

For most practical applications, the improvement to be obtained in the ground speed determination must be extended to the determination of drift angle relative to the earth (rather than to the moving sea surface). Therefore, it is further postulated that the observed drift angles $\alpha_o$ and $\alpha_o'$ for two operating modes of one system will be related to the true drift angle $\alpha$, measured over land, by the equations $\alpha_o = \alpha + \delta$ and $\alpha_o' = \alpha + \delta'$, wherein $\delta$ and $\delta'$ are functions of the crosstrack components of water motion, $s_d$ and $s_d'$, which are also functions of sea state and which further exhibit a constant ratio for a given pair of systems.

Theoretical calculations of over water shift $\epsilon$ can be made from the knowledge of the antenna patterns and other characteristics of a Doppler radar system and a knowledge of the function $\sigma(\psi)$, wherein $\psi$ is the angle of incidence (measured from the vertical) of the radar beam and $\sigma$ is the back-scattering coefficient which is the measure of the fraction of the power incident to the sea which is back-scattered. It is not essential for the purposes of this invention to go into details of how such calculations are made. It might be noted, however, that in certain sophisticated systems a technique known as beam-lobing is employed which results in the effective value of $\epsilon$ being quite small and nearly independent of sea state. Such a system would be one described in U. S. Pat. Nos. 3,235,865, 3,192,523 or 3,113,308.

Again, the present invention is based as well upon an additional fact not clearly recognized until recently. Namely, that the values of the $s$, $s'$, $\delta$ and $\delta'$ as sensed by Doppler radar systems having different characteristics (or a system having correspondingly different modes of operation) are, in general, different. Moreover, it appears that the relationships between the values of $s$ and $s'$ and between $\delta$ and $\delta'$ as sensed in two appropriately selected modes of operation, is systematic; that is, within reasonable limits, they can be represented by definite functions and by ones which are not an explicit function of the sea state. Consequently, with $\epsilon$, $\epsilon'$, $s$, $s'$, $\delta$ and $\delta'$ all determinable, the true ground speed and drift angle of the aircraft while over water may be determined.

In accordance with one embodiment of the invention, an apparatus is provided for determining the speed and drift angle of an aircraft above water with respect to ground, including means for transmitting electromagnetic energy from the aircraft toward the water below. The electromagnetic energy reflected from the water below is detected by two different receiving means which can be sequentially operable or simultaneously operable, having at least one characteristic (such as polarization of the signal, frequency or looking angle) different from the other. Each receiving means produces a signal indicative of an apparent speed including as constituents thereof, a water motion variable which is dependent upon sea state. However, since these water motion variables bear the hereinabove noted relationship to each other, the actual speed can be determined by utilizing the two apparent speeds. In a similar vein, the drift angles can be determined by utilizing the values of apparent drift angles and combining them, in an appropriate manner, knowing the relationship of the water motion variables of the drift angle components.

SUMMARY AND OBJECTS OF THE INVENTION

The object of this invention is to provide new and improved methods for obtaining the true velocity of an aircraft, flying above the sea, with respect to the land.

It is another object of this invention to provide new and improved systems for accurately obtaining Doppler velocity measurements over the sea.

Yet another object of this invention is to provide new and improved methods of and apparatus for the correction of received Doppler signals so as to compensate for so-called water motion effects on true ground speed.

A further object of this invention is to provide new and improved methods and apparatus for the correction of received Doppler signals so as to compensate for so-called water motion effects on true drift angle.

With these and other objects in mind, methods of and apparatus for determining the speed V of an aircraft above water with respect to land is provided by producing a signal $V_o$ indicative of apparent speed by means of a first Doppler radar mode. In a similar fashion, a signal $V_o'$ is produced, different from the signal $V_o$, indicative of apparent speed by means of a second Doppler radar mode. The two signals $V_o$ and $V_o'$ are combined and, by virtue of known relationships of the constituents thereof, a signal is produced indicative of the speed V.

Further, methods and apparatus for determining the drift angle, $\alpha$, of the aircraft above water with respect to land is provided by producing a signal $\alpha_o$ indicative of apparent drift angle as appears to the first Doppler mode, and a signal $\alpha_o'$ indicative of apparent drift angle as appears to the second Doppler mode. The two signals $\alpha_o$ and $\alpha_o'$ are combined and, by virtue of known relationships of the constituents thereof, a signal is produced indicative of the true drift angle $\alpha$.

BRIEF DESCRIPTION OF THE DRAWINGS

Other objects, advantages, and aspects of the invention will become apparent by reference to the following detailed specification and drawings of a specific embodiment thereof, wherein.

DESCRIPTION OF A PREFERRED EMBODIMENT

Figure 1:
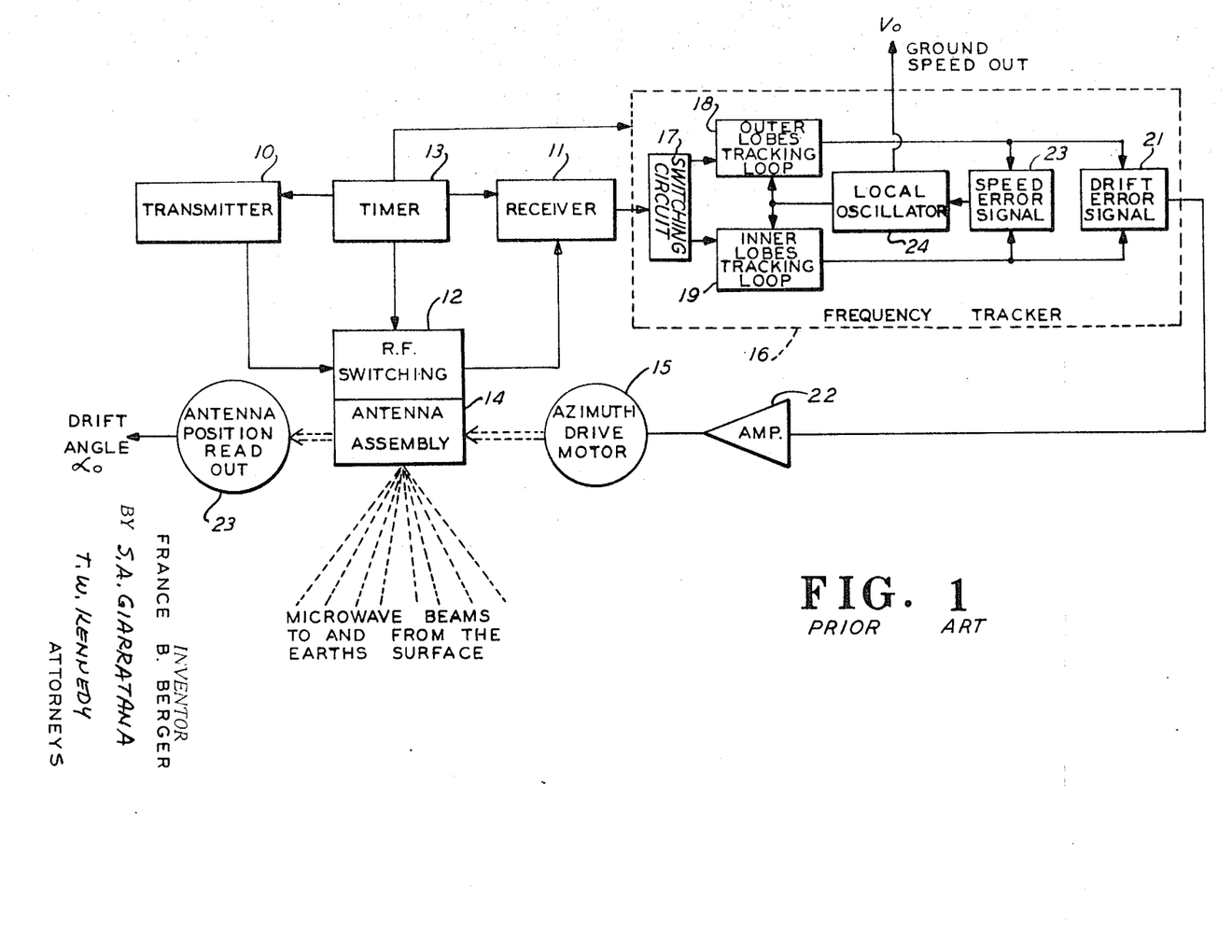
FIG. 1 is a simplified block diagram of a prior art beam-lobed Doppler radar system.

Referring to FIG. 1 there is shown a simplified functional diagram of a beam lobed Doppler radar system, well known to the prior art, and well suitable for the measurement of ground speed V of an aircraft flying above land and for the measurement of the drift angle $\alpha$. The drift angle $\alpha$ representing the angle between the horizontal projection of the center line of the aircraft (heading) and the horizontal projection of the velocity vector (ground track). For a description of the operation of such a system reference should be made to U. S. Pat. No. 3,134,102.

Figure 2:
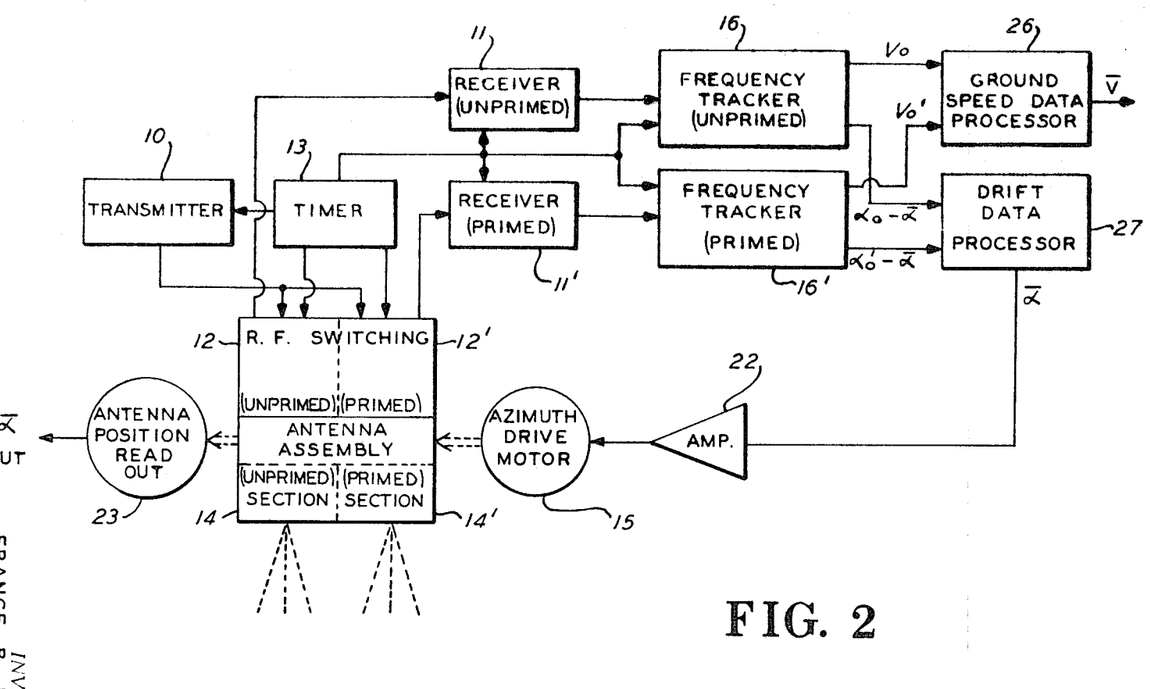
FIG. 2 is a block diagram of a preferred embodiment of this invention, including, as portions thereof, various blocks shown in FIG. 1, together with additional components including a ground speed data processor and a drift data processor.

Referring to FIG. 2, there is shown a radar system including common components to that shown in the prior art system of FIG. 1, in which like components are indicated by like reference numerals and duplicated components are shown by reference numerals including a prime attached thereto. More specifically, as shown in FIG. 2, the preferred embodiment includes a transmitter 10 substantially equivalent to the transmitter 10 shown in FIG. 1.

The embodiment of FIG. 2 includes a receiver 11 and a receiver 11'. The transmitter 10 is coupled to a RF switching circuit 12 and an RF switching circuit 12'. The RF switching circuit 12 is coupled to the receiver 11 while the switching circuit 12' is coupled to the receiver 11'. The RF switching circuits 12 and 12' are coupled through an antenna assembly including an unprimed section 14 and a prime section 14'. The unprimed section 14 is coupled to one antenna or set of antennas, not shown, while the prime section 14' is coupled to a separate antenna or antennas, not shown.

A timer 13 is coupled to the RF switching circuits 12 and 12', to the transmitter 10, and to the receivers 11 and 11'. An azimuth drive motor 15 is coupled to the antenna assembly to control the orientation of the antennas which are part of the 14 and 14' antenna assembly.

The timer 13 is further coupled to a frequency tracker 16 and to another frequency tracker 16'. The receiver 11 is coupled to the frequency tracker 16 while the receiver 11' is coupled to the frequency tracker 16'.

The frequency tracker 16 provides two outputs therefrom: a first output $V_o$ and a second output $\alpha_o - \bar{\alpha}$. The output $V_o$ is a signal indicative of apparent speed (a scalar quantity) while the output signal $\alpha_o - \bar{\alpha}$, is indicative of the apparent drift angle which is also scalar quantity, wherein $\alpha_o$ is the apparent drift angle of the aircraft over water as indicated by one channel and $\bar{\alpha}$ is the average value of the true drift angle as determined by the two channels. In a similar fashion, the frequency tracker 16' provides two outputs therefrom: a first output $V_o'$ and a second output $\alpha_o' - \bar{\alpha}$, both scalar quantities indicative of the apparent velocity from the tracker 16'. The quantity $V_o'$ indicates apparent speed whereas the quantity $\alpha_o' - \bar{\alpha}$ is indicative of the apparent drift angle obtained from the frequency tracker 16', wherein $\alpha_o'$ is the apparent drift angle of the aircraft over water as indicated by the second channel.

The values $V_o$, $V_o'$, $\alpha_o$ and $\alpha_o'$ will differ when particular characteristics of the primed and unprimed systems are different. For example, when the primed section of the antenna assembly 14' maintains its antenna such that the transmitted signal is horizontally polarized, and the unprimed section 14 maintains its antenna such that its transmitted signal is vertically polarized, different signals will be produced by the frequency trackers 16 and 16' when flying over water.

Or alternatively, when the two antenna systems have different angles of incidence $\psi$, with respect to the vertical different values for $V_o$, $V_o'$, $\alpha_o$ and $\alpha_o'$ result.

The first outputs of each of the two trackers 16 and 16' are coupled to a ground speed data processor 26 while the second outputs of the two trackers are coupled to a drift angle data processor 27.

The ground speed data process 26, performing various manipulations on the inputted signals, outputs a signal, $\bar{V}$, which equals the average value of the aircraft's true speed over water.

In a similar fashion, the drift angle data processor 27 manipulates the signals inputted to it, outputting a signal $\bar{\alpha}$ which is then power amplified by amplifier 22 to a level sufficient to drive the azimuth drive motor 15, which in turn is mechanically coupled to the antenna assembly. The antenna assembly is rotated until it is positioned at $\bar{\alpha}$, the average value of the aircraft's true drift angle over water. Coupled to the antenna assembly could be an antenna position indicator 23 which provides an indication of the aircraft's true drift angle.

As indicated above the overall system of FIG. 2 is essentially a Doppler system which is well known in the prior art. The duplication of appropriate system functional blocks and the addition of the data processors result in an improved system which provides truer indications of aircraft speed and drift angle over water, and which is the subject of this invention.

As stated earlier, when operating over the sea, it is postulated that the observed ground speed $V_o$ differs from $V$ by a factor $\epsilon$ proportional to speed called the over water shift, and by an incremental speed s due to the wind driven component of water motion. Similarly, for $V_o'$. Specifically, $$V_o = V(1 + \epsilon) + s \qquad (1)$$

$$V_o' = V(1 + \epsilon') + s' \qquad (2)$$

The quantities $\epsilon$ and s and $\epsilon'$ and s' are, in general, functions of the sea state. The quantities $\epsilon$ and $\epsilon'$ are fixed functions of sea state and equipment and can be determined experimentally or calculated for a given sea state and particular configuration of Doppler apparatus.

As stated earlier, there are numerous selections of transmitter frequencies, angles of incidence, or polarization which yield different values of s. For the purpose of this invention, parameter selections are desired which result in s and s' differing by a large amount and having a functional relationship which is minimally dependent upon sea state.

From data obtained in numerous flight tests with different specific Doppler systems using differently polarized antennas, different angles of incidence and different frequencies, it has been found while operating over a variety of sea states that $$s/s' = R, \text{ a constant} \qquad (3)$$

Referring to equations (1) and (2), the relationship is obtained:

$$\Delta V_o = V_o - V_o' = V(\epsilon - \epsilon') + (s - s') \equiv V\Delta\epsilon + V\Delta s \qquad (4)$$

Now, from (3)
$$\Delta s = s R - 1/R = s'(R - 1) \qquad (5)$$

And from (4)
$$\Delta V_o - V\Delta\epsilon = \Delta s \qquad (4a)$$

Since, from (5)
$$s = (R)/(R - 1) \Delta s \qquad (5a)$$

and $s' = \Delta s/R - 1 \qquad (5b)$

Then, from (4a), (5a) and (5b)
$$s = R/R - 1 \ (\Delta V_o - V\Delta\epsilon) \approx R/R - 1 \ (\Delta V_o - V_o\Delta\epsilon),$$
and $\qquad (6a)$ $$s' = 1/R - 1 \ (\Delta V_o - V\Delta\epsilon) \approx 1/R - 1 \ (\Delta V_o - V_o'\Delta\epsilon) \qquad (6b)$$

From (1) and (2), the true ground speed, relative to land is given by
$$V = (V_o - s)/(1 + \epsilon) \qquad (7a)$$

and also by
$$(V_o' - s')/(1 + \epsilon') \qquad (7b)$$

Extending the above to the determination of drift angle it appears that the drift or cross track component of water motion $s_d$ is sensed analogously to the ground speed or track components. Thus, for a system comprised of two operating modes varying in frequency, polarization or incidence angles or generally any combination of the three it appears that:

$$s_d/s_d' = R, \text{ a constant} \qquad (8)$$

Relationships, then, that can be used to determine approximately the drift angle relative to the earth, rather than to the moving sea surface, are as follows, where the terminology of the preceding paragraphs is retained and extended:

$\alpha = \alpha' =$ the true drift angle as measured over land (9)

The observed values over the sea are:

$$\alpha_o = \alpha + \delta \text{ and} \qquad (10)$$

$$\alpha_o' = \alpha + \delta' \qquad (11)$$

and if $$\Delta\alpha_o = \alpha_o - \alpha_o', \text{ then}$$
$$\Delta\alpha_o = \delta - \delta' \equiv \Delta\delta \qquad (12)$$

Figure 5:
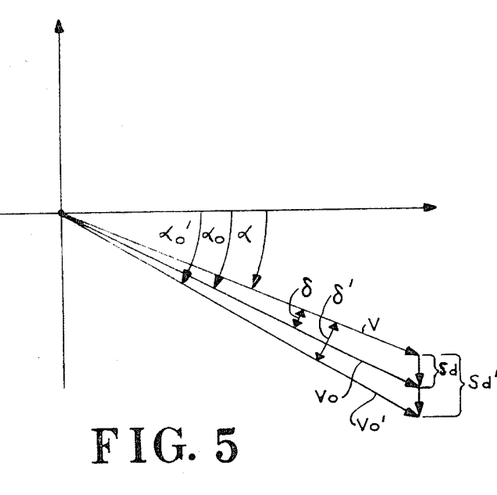
FIG. 5 is a simple vector diagram relating ground track velocity and the cross track water motion component.

From (8) and FIG. 5 it is observed that $$s_d/s_d' = s_d/V/s_d'/V \approx \delta/\delta' = R \qquad (8a)$$

for $V >> s_d$ and $s'_d$.
From (12) and (8a)

$$\Delta\alpha_o = \delta(1 - 1/R) = \delta\, R{-}1/R, \text{ and} \qquad (13a)$$

$$\Delta\alpha_o = \delta'(R-1) \qquad (13b)$$

since, from (10), $\alpha = \alpha_o - \delta$ then, from (13a)
$$\alpha = \alpha_o - R/R{-}1\, \Delta\alpha_o \qquad (14a)$$

and from (11) and (13b)
$$\alpha = \alpha_o' - 1/R{-}1\, \Delta\alpha_o \qquad (14b)$$

Substituting 6a in 7a, and 6b in 7b the following expressions for V result:

$$V = \frac{V_o - \left\{\frac{R}{R-1}(\Delta V_o - V_o\Delta\epsilon)\right\}}{1+\epsilon} \qquad (15a)$$

$$V = \frac{V_o' - \left\{\frac{1}{R-1}(\Delta V_o - V_o'\Delta\epsilon)\right\}}{1+\epsilon'} \qquad (15b)$$

The effects of Doppler fluctuation errors and certain bias type errors as well make it preferable to average the data from the two channels. This results in the following:

$$\overline{V} = \tfrac{1}{2}[(V_o + V_o') - \tfrac{1}{2}(V_o + V_o')\{\epsilon + \epsilon' - \Delta\epsilon(R+1)/(R-1)\} - \Delta V_o\,(R+1)/(R-1) + \Delta V_o/2\,(R+1)/(R-1)\{\epsilon + \epsilon' - \Delta\epsilon\,(R+1)/(R-1)\}] \qquad (16)$$

Similarly, averaging 14a and 14b the following results:

$$\overline{\alpha} = \tfrac{1}{2}\{(\alpha_o + \alpha_o') - \Delta\alpha_o\,(R+1)/(R-1)\} \qquad (18)$$

Figure 3:
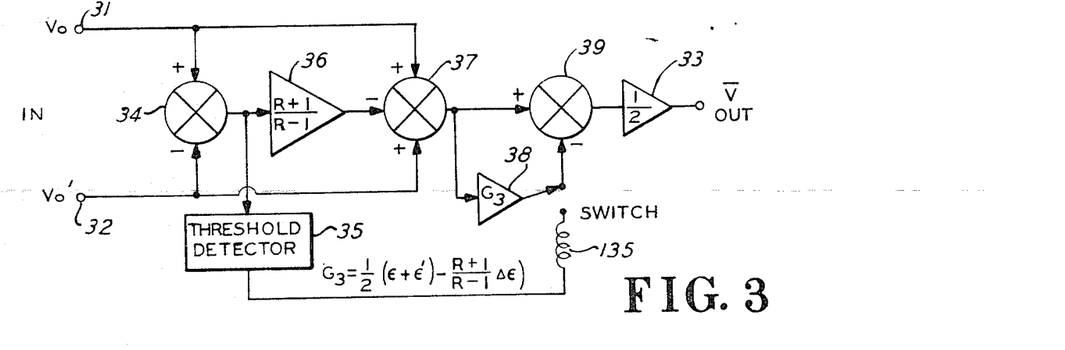
FIG. 3 is a detailed block diagram illustrating the ground speed data processor shown in FIG. 2.

Referring to FIG. 3, there is shown a circuit suitable for the ground speed data processor circuit 26. The circuit 26, as shown therein, includes two inputs thereto: an input $V_o$ applied to a terminal 31 and an input $V_o'$ applied to a terminal 32. An output indicative of $\overline{V}$, the aircraft's true ground speed, is obtained from the output terminal 33.

The circuit shown in FIG. 3 illustrates the functioning of the processor in detail. The ground speed data processor 26 is fashioned so at to implement the equation (16) when functioning in the system.

The terminals 31 and 32 are coupled to an analog subtracting circuit 34 which provides an output therefrom indicative of the difference $V_o - V_o'$ (i.e., $\Delta V_o$). The output from the analog subtracting circuit 34 is coupled to an amplifier 36 and to a threshold detector 35. The amplifier 36 amplifies the signal applied thereto so as to provide an output signal therefrom, which multiplies the input signal by the fixed quantity $R+1/R-1$.

The terminals 31 and 32 and the output from the amplifier 36 are coupled to an analog summing circuit 37 which provides an output therefrom, in an analog relationship, equal to the sum of the signals on the terminals 31 and 32 less the signal from the output of the amplifier 36. Hence, the output from the summing circuit 37 yields an analog value equal to:

$$(V_o + V_o') - (V_o - V_o')\, R{+}1/R{-}1.$$

The output from the analog summing circuit 37 is coupled to an amplifier 38. The output of the amplifier 38 and the output of the summing circuit 37 are coupled to difference circuit 39 which provides an analog output therefrom, onto the terminal 33, equal to the output of the circuit 37 less the output of the circuit 38.

The amplifier 38 amplifies the signal applied thereto by a factor of $\tfrac{1}{2}(\epsilon+\epsilon' - R{+}1/R{-}1\,\Delta\epsilon)$. It is noted that such factor is a constant and is known because the values $\epsilon, \epsilon', \Delta\epsilon$ and R are all known. Thus, since the output from the amplifier 38 multiplies the signal applied at the input thereof by the quantity $\tfrac{1}{2}(\epsilon+\epsilon' - R{+}1/R{-}1\,\Delta\epsilon)$, the output from the difference circuit 39 yields a value equal to:

$$\{(V_o + V_o') - (V_o - V_o')\,R{+}1/R{-}1\}\{1 - \tfrac{1}{2}(\epsilon + \epsilon' - \Delta\epsilon\,R{+}1/R{-}1)\} = 2\overline{V} \qquad (16a)$$

Expanding, wherein $(V_o - V_o')\quad \Delta V_o'$
$$\overline{V} = \tfrac{1}{2}[(V_o + V_o') - \tfrac{1}{2}(V_o + V_o')\{\epsilon + \epsilon' - \Delta\epsilon\,(R+1)/(R-1)\} - \Delta V_o\,(R+1)/(R-1) + \Delta V_o/2\,(R+1)/(R-1)\{\epsilon + \epsilon' - \Delta\epsilon(R+1)/(R-1)\}] \qquad (16b)$$

which is identical to equation (16).

Hence, the ground speed data processor 26 is fashioned so as to implement equation 16 when functioning in a system. If beam lobing is so effective in reducing calibration shift errors $\epsilon$ and $\epsilon'$, that such errors can be ignored, it is obvious that the loop involving the amplifier 38 can be eliminated. To the extent that a doppler system's performance accuracy can tolerate treating the calibration shifts as constants, independent of sea state, the processor 26 can also be amployed in non-beam lobed systems.

When the system is operating over land, $V_o$ and $V_o'$ are supposedly equal, and the output of the amplifier 36 is zero, as it should be. The shift correction inserted through the loop including the amplifier 38, however, should be deactivated over land. This deactivation may be performed automatically as illustrated using a threshold detector 35; whenever $\Delta V_o$ exceeds some suitably selected small value, thus indicating flight over water, the output of the amplifier 38 is no longer subtracted out. Any alternative means of determining whether the system is over water or land could be used to control the cutout switch 135.

Figure 4:
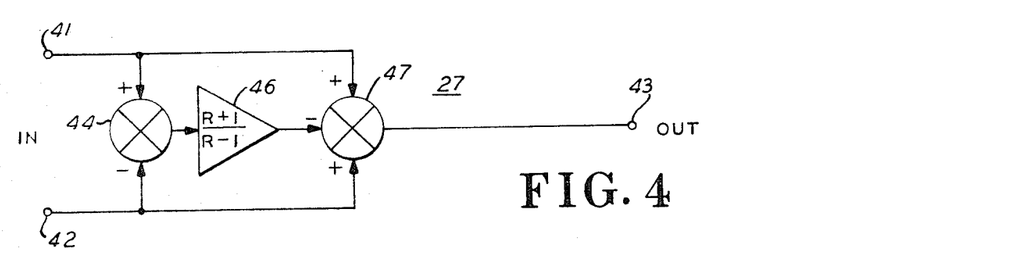
FIG. 4 is a detailed block diagram illustrating the embodiment of a drift data processor illustrated in FIG. 2.

Referring to FIG. 4 there is shown a circuit suitable to effect the drift data processor function when utilized in antenna stabilization systems as, for example, the one depicted in FIG. 2. This system responding to well known servo principles utilizes the fact that when the antenna assembly's longitudinal axis is not collinear with ground track, the Doppler frequency shifts for each pair of transmitter beams in a four beam system will not be equal. The difference between the shifts for each beam pair provides a signal at the output of the frequency tracker which, through an amplifier such as 22 in FIG. 2, powers the azimuth drive motor 15, so as to rotate the antenna until the difference signal goes to a null. This corresponds to the position where the antenna's longitudinal axis is collinear with ground track. Utilizing the known relationship of the antenna's longitudinal axis, to the aircraft's longitudinal axis a measurement of drift angle is obtained which could be observable on a position readout such as 23 in FIG. 2.

When such a system is flown over water, the water motion effect contributes an error to the observed drift angle. This instantaneously results in signals $\alpha_o - \bar{\alpha}$ and $\alpha_o, -\bar{\alpha}$ appearing at the second outputs of trackers 16 and 16' respectively.

Referring again to FIG. 4, input terminals 41 and 42 receive signals $(\alpha_o-\bar{\alpha})$ and $(\alpha_o'-\bar{\alpha})$, respectively. The terminals 41 and 42 are coupled to a difference circuit 44 which provides an output therefrom equal to the difference of the signals applied to the terminals 41 and 42. The output of the difference circuit 44 is coupled to an amplifier 46 which amplifies the signal applied to its input by a factor $R+1/R-1$. The output from the amplifier 46 is coupled to a summing circuit 47 which also receives signals from the terminals 41 and 42 so that the output from the summing circuit 47 yields an output equal to the summing of the signals from the terminals 41 and 42 less the output from the amplifier 46. Hence, the output from the summing circuit 47 yields this result:

$$E_o = (\alpha_o-\bar{\alpha}) + (\alpha_o' -\bar{\alpha}) - R+1/R-1 \{ (\alpha_o -\bar{\alpha}) - (\alpha_o' -\bar{\alpha})\} \quad (18a)$$

The output from the summing circuit 47 is coupled through the amplifier 22 and the azimuth drive motor 15 to the antenna assembly 14, 14'.

The antenna assembly 14 and 14' is driven until the output of the summing circuit 47 is nulled. In other words, $$E_o = o = (\alpha_o-\bar{\alpha}) + (\alpha_o'-\bar{\alpha}) - R+1/R-1 \{ (\alpha_o-\bar{\alpha}) - (\alpha_o'-\bar{\alpha})\} \quad (18b)$$

Rearranging terms and consolidating, the following results:

$$\bar{\alpha} = \tfrac{1}{2} \{ (\alpha_o+\alpha_o') - \Delta\alpha_o R+1/R-1 \} \quad (18c)$$

From this it is observed that tha antenna assembly 14 and 14' has achieved a position which satisfied equation 18. This position is evidenced by the antenna position readout 23, which is $\alpha$ or the true drift angle.

Figure 6:
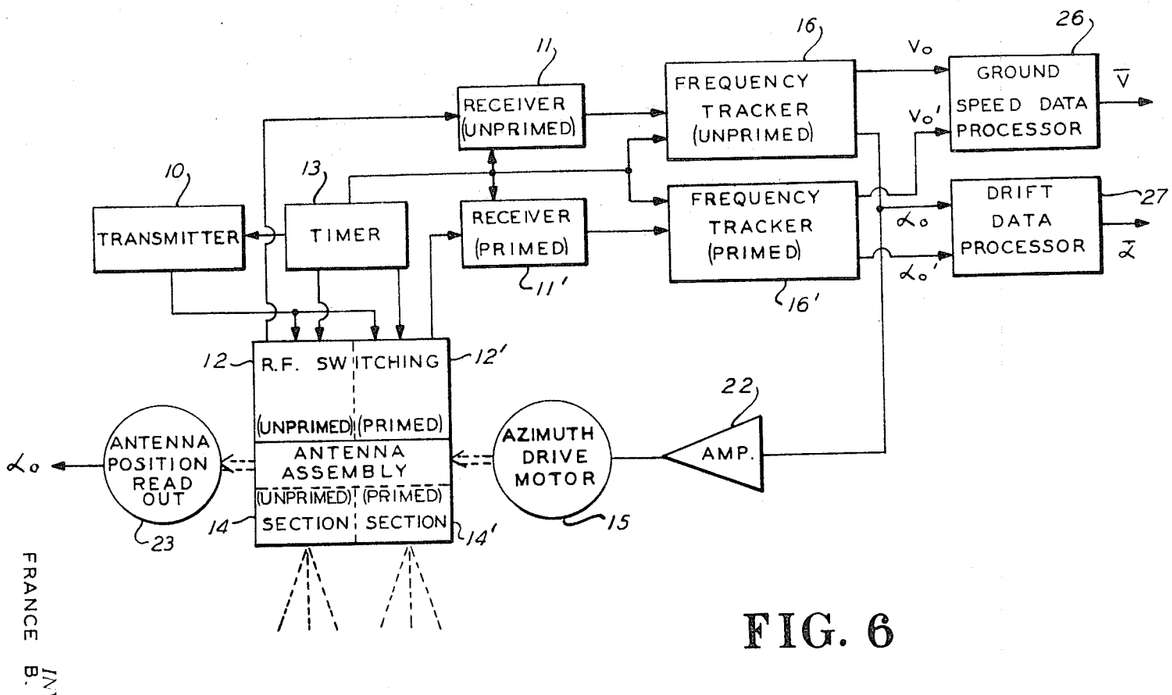
FIG. 6 is a block diagram illustrating a different embodiment of the invention involving variations in the interconnections with the azimuth drive motor, frequency tracker and the drift data processor.

Another means for determining the true drift angle utilizing the data processor of FIG. 4 is represented by the system configuration of FIG. 6. This is comprised of identical functional blocks as the system in FIG. 2, however, instead of the antenna assembly 14, 14' being positioned by the amplified output of summing circuit 47, the second output of tracker 16, coupled through amplifier 22, provides the drive signal required to position the antenna assembly 14, 14'. However, the antenna assembly will position itself so as to null the signal appearing at the second output of tracker 16, which is equivalent to $\alpha_o$. Tracing the signal flow through the drift data processor, however, will indicate that the output of summing amplifier 47 will now be equivalent to $2\bar{\alpha}$, or twice the true drift angle.

Various modifications of the aforedescribed embodiment, including those developed around other Doppler radars (than the type shown in FIG. 1) can be easily developed, if not self evident, from what has been described. Comment is required, however, on the use of water motion correction with systems without beam lobing in which the calibration shift $(\epsilon)$ are large. When those shifts are large, their dependence on sea state is quantitatively more significant.

The correction in this situation can be effected by making the gain of the amplifier 38 (FIG. 3) vary with sea state as $\epsilon$ and $\epsilon'$ vary, the dependency of $\epsilon$ and $\epsilon'$ on sea state being previously known, from measurement or calculation.

The water motion correction technique provides a suitable means of measuring the sea state. The magnitude S of the water motion velocity vector is such a measure. The magnitude S is given by:

$$S = \sqrt{s^2 + s_d^2} \quad (19a)$$

whereas S' for the alternate operating mode is given by $$S' = \sqrt{s'^2 + s_d'^2} \quad (19b)$$

Desirably, but not necessarily, $\epsilon(S) = \epsilon'(S)$, however a reasonable expectation, is that $\epsilon$ and $\epsilon'$ are expressable as functions of $\bar{S}^2 = \tfrac{1}{2}(S^2 + S'^2)$ (20)

Substituting for $S^2$ and $S'^2$ from 19a and 19b the following results:

$$\bar{S}^2 = \tfrac{1}{2}(s^2 + s_d^2 + s'^2 + s_d'^2) \quad (21)$$

from 8a, 13a and 13b:

$$s_d/V = \delta = R\Delta\alpha_o/R - 1 \quad (22a)$$

$$s_d'/V = \delta' = \Delta\alpha_o/R - 1 \quad (22b)$$

and $$s_d^2 = V^2 R^2/(R-1)^2 \Delta\alpha_o^2 \quad (22c)$$

and $$s_d'^2 = V^2 \Delta\alpha_o^2/(R-1)^2 \quad (22d)$$

from 6a and 6b $$s^2 = R^2/(R-1)2 (\Delta V_o - V\Delta\epsilon)^2 \quad (23a)$$

$$s'^2 = 1/(R-1)2 (\Delta V_o - V\Delta\epsilon)^2 \quad (23b)$$

Substituting in 21 the following is obtained:

$$\bar{S}^2 = \tfrac{1}{2}\{R^2/(R-1)2(\Delta V_o - V\Delta\epsilon)^2 + 1/(R-1)^2 (\Delta V_o - V\Delta\epsilon)^2 + s_d^2 + s_d'^2\} \quad (24a)$$

$$= \tfrac{1}{2}\{R^2 + 1/(R-1)^2 (\Delta V_o - V\Delta\epsilon)^2 + s_d^2 + s_d'^2\} \quad (24b)$$

Combining 22c and 22d the following is obtained:

$$s_d^2 + s_d'^2 = V^2 \Delta\alpha_o^2/(R-1)^2 (R^2+1) \quad (25)$$

Substituting in 24b:

$$\overline{S}^2 = \frac{1}{2} R^2 + 1/(R-1)^2 \{ (\Delta V_o - V \Delta \epsilon)^2 + V^2 \Delta \alpha_o^2 \} \quad (26)$$

Figure 7:
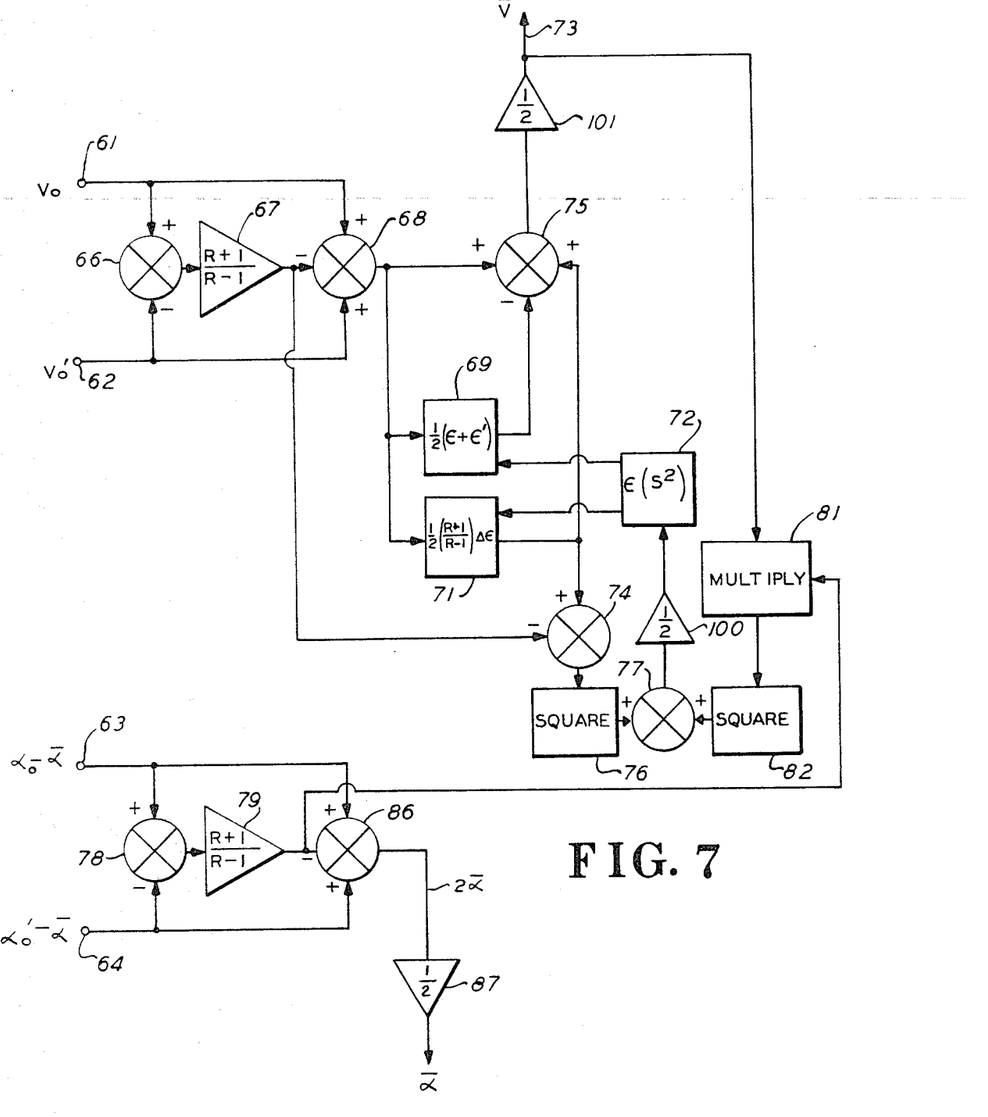
FIG. 7 is a detailed block diagram illustrating a combined ground speed data processor and drift data processor for systems wherein shift corrections are a function of sea state with sea state determined from water motion data.

FIG. 7 indicates how both the calibration shift and water motion corrections discussed above can be implemented. FIG. 7 is developed around FIG. 3 and 4. Referring to FIG. 7, signals $V_o$ and $V_o'$ from the first outputs of trackers 16 and 16' respectively, are applied onto terminals 61, 62, respectively. Signals indicative of $(\alpha_o - \overline{\alpha}_\phi)$ and $(\alpha_o' - \overline{\alpha})$ from the second outputs of trackers 16 and 16' respectively, are applied to terminals 63, 64, respectively. The terminals 61, 62 are coupled to an analog difference circuit 66 which provides an output signal corresponding to the difference $(V_o - V_o')$, identified hereinafter as $\Delta V_o$. The signal $\Delta V_o$ is coupled to an amplifier 67 having a gain $(R + 1)/(R - 1)$. The output of the amplifier 67 is coupled to a negative terminal of analog summing circuit 68 to which the signals $V_o$ and $V_o$, at the terminals 61, 62 respectively, are coupled. Hence, the output of the analog summing circuit 68 provides a signal representative of the quantity $$(V_o + V_o, - \Delta V_o R + 1/R - 1).$$

The summing circuit 68 output signal is coupled to a first variable gain amplifier 69 which amplifies the signal applied thereto by the function $\frac{1}{2} (\epsilon + \epsilon')$. The summing circuit 68 output signal, also is coupled to another variable gain amplifier 71 which amplifies the signal applied thereto by the function $\frac{1}{2} (R+1)/(R-1) \Delta\epsilon$. The gain of the amplifiers 69 and 71 are controlled by a functional block 72 which is described in greater detail hereinafter. The outputs of the amplifiers 69, 71 and the output from the circuit 68 are coupled to a summing circuit 75 which provies an output therefrom of $2\overline{V}$ equal to the sum of the outputs of the circuit 68 and the amplifier 71 less the output of the amplifier 69. Hence, referring to FIG. 7.

$$\overline{V} = \frac{1}{2} \{(V_o + V_o') - \Delta V_o (R + 1)/(R - 1)\} \{1 - (\frac{1}{2})(\epsilon + \epsilon') + (\frac{1}{2}) (R + 1)/(R - 1) \Delta \epsilon\} \quad (27)$$

Expression (27), represents the output $\overline{V}$ appearing on the output line 73, after the output of summing circuit 75 is attenuated by a first attenuator circuit, 101. Expanding (27).

$$\overline{V} = \frac{1}{2}[(V_o + V_o') - \frac{1}{2}(V_o + V_o')\{\epsilon + \epsilon' - \Delta\epsilon R + 1/R - 1\} - \Delta V_o R + 1/R - 1 + \Delta V_o/2 R + 1/R - 1 \{\epsilon + \epsilon' - \Delta \epsilon R + 1/R - 1\}] \quad (27a)$$

This equation (27a) is identical to equation (16).

Referring back to FIG. 7, there is shown an analog difference circit 74. The output of amplifier 71 is coupled to the positive terminal thereof. A signal having the value $R + 1/R - 1 \Delta V_o$ which occurs at the output of amplifier 67 is applied to the negative terminal of the difference circuit 74. The output from the difference circuit 74 is squared in a squaring circuit 76 and is applied to one input of an analog summing circuit 77.

The signals $\alpha_o - \overline{\alpha}_\phi$ on terminal 63 and the signal $\alpha_o' - \overline{\alpha}$ on terminal 64 are coupled to an analog difference circuit 78 which provides an output therefrom equal to $\alpha_o - \alpha_o'$ or, expressed in other terms, $\Delta\alpha_o$. The signal $\Delta\alpha_o$ is amplified by the amplifier 79 so that the output therefrom yields the signal having the value $R + 1/R - 1 \Delta\alpha_o$. This latter signal is coupled to an electronic multiplying circuit 81 so that it is multiplied by the function $\overline{V}$ which appears on the output of the first attenuator circuit 101, so that the output from the multiplication circuit 81 yields an output value $$\overline{V} (R + 1)/(R - 1) \Delta\alpha_o .$$

This output value is squared in the squaring circuit 82 and is applied to a second input of the summing circuit 77. The output from the summing circuit 77 is halved by a second attenuator 100. The output, hence, from the attenuator 100 provides a value $S^2$ which satisfied the following relationship:

$$S^2 = \frac{1}{2} [ \{ \frac{1}{2} \{ V_o + V_o' - \Delta V_o R + 1/R - 1 \}\{R + 1/R - 1 \Delta \epsilon \} - \{ \Delta V_o R + 1/R - 1\}\}^2 + \{(\Delta\alpha_o R + 1/R - 1) \overline{V}\}^2 ] \quad (28)$$

Expanding equation (28), the following is obtained:

$$S^2 = \frac{1}{2} [\{(\frac{1}{2}) (V_o + V_o') R + 1/R - 1 \Delta \epsilon - \Delta V_o R + 1/R - 1 - \frac{1}{2} (R + 1/R - 1)^2 \Delta V_o \Delta \epsilon\}^2 + \{\overline{V} \Delta\alpha_o R + 1/R - 1\}^2] \quad (28a)$$

The third member within the first bracketed terms, $\frac{1}{2} (R + 1/R - 1)^2 \Delta V_o \Delta\epsilon$ term, can be neglected since it is second order in correction terms (i.e., it is small, compared to the first two terms.) To a high degree of approximation $$\frac{1}{2} (V_o + V_o') \approx \overline{V} \approx V.$$

Hence, equation (28a) can be rewritten as:

$$S^2 = \frac{1}{2} (R + 1/R - 1)^2 \{ V^2 \Delta\alpha_o^2 + (\Delta V_o - V\Delta\Delta\epsilon)^2 \quad (28b)$$

which is identical to equation (26).

Since $\epsilon$ and $\epsilon'$ for any given system configuration are known functions of $S^2$, the function generator 72, being preprogrammed, operates on the signal representing the values $S^2$ applied thereto outputting a signal $(\epsilon + \epsilon')$ on a first output and a signal $\Delta\epsilon$ on a second output. The first output of function generator 72 is coupled to the first variable gain amplifier 69, so as to control the gain thereof, so that amplifier 69 presents a gain of $1/2 (\epsilon + \epsilon')$ to the signal inputted thereto. The second output of function generator 72 is coupled to the second variable gain amplifier 71, controlling the gain thereof, so that the amplifier 71 presents a gain of $\frac{1}{2} R + 1/R - 1 \Delta\epsilon$ to the signal inputted thertо.

Referring now to the bottom portions of FIG. 7, which operates in a similar fashion to the related portions of FIG. 4, the amplifier 79 is coupled to the negative terminal of an analog summing circuit 86. The terminals 63 and 64 are coupled to positive terminals thereof so that the output of the summing circuit 86 provides a signal corresponding to the value $$(\alpha_o - \overline{\alpha}) + (\alpha_o' - \overline{\alpha}) + R + 1/R - 1 \Delta\alpha_o).$$

The signal is coupled to an amplifier 87 which powers an azimuth drive motor such as 15 in FIG. 2, said motor positioning the antenna assembly until the output of summing circuit 86 is driven to a null. As hereinabove described, at equations 18b and 18c, the position the antenna assembly achieves will be $\alpha_o$ or the true drift angle.

Various modifications may be performed without departing from the spirit and scope of this invention. For example, a vertically polarized signal can be transmitted, and two receiving antennas can be utilized, one of vertical polarization and the other for horizontal polarization. Similarly, a horizontally polarized signal can be transmitted and two receiving antennas used: one for vertical and the other for horizontal polarization. Also, both a horizontally polarized signal can be transmitted and a vertically polarized signal transmitted and two separate receiving antennas used, one for horizontal polarization and and the other for vertical polarization respectively. Each technique would be effective for carrying out the teachings of this invention.

Different frequencies can be utilized to provide the different modes of operation. Such different frequencies can be, by way of example located in X band and K band. Similarly, differing "looking" or gamma angles for each mode can be utilized.

In summary, this invention makes use of the observed fact that the water motion effect S varies with different radar systems depending upon horizontal or vertical polarization of the antenna, the beam angle of the antenna or different operating frequencies. Although known that each radar system of the prior art has in general a different sea return motion effect, it is observed that the ratio of the sea return motion effect of S for one radar system with respect to S' of a different radar system is usually constant. Making use of that constant ratio factor, the true velocity can be calculated. This is achieved, by practicing the teachings of this invention, in which one system has two modes of operation, and by utilizing the data received and converting the data in accordance with equations (17) and (18). Apparatus for so calculating the velocity, (e.g., speed and drift angle) can be produced in accordance with the teachings set forth in the specification.

Although, with data obtained, it appears that the ratio of S to S' is a constant, if it should be determined upon obtaining more extensive data or with certain other radar mode implementations that the relationship of S to S' with regard to two specific radar modes is some other reasonable function such as a quadratic, such a relationship can be substituted in equations (1) and (2) and the corresponding equations for $\bar{V}$ and $\bar{\alpha}$ developed. Embodiments similar to those depicted in FIG. 3, 4 and 7 could then be developed to implement the resulting equations.

In a system where beam lobing is utilized, the values $\epsilon$ and $\epsilon'$ are effectively quite small and independent of sea state. However, in systems without beam lobing where $\epsilon$ would tend to be quite large and sea state dependent, the data processors depicted in FIG. 7 would be preferred.

Various incidental details of construction, related to smoothing time, switching, etc., not essential to conveying the essence of the invention have been deleted in an effort to simplify the description of the invention and to avoid unneccessary descritptive detail, it being a purpose of this description to describe the invention in a concise, clear and full manner.

It should be noted at this point that the total motion of the scatterers which produce the radar signal from the sea can be thought of as the vector sum of a geostrophic and/or tidal current contribution and of a wind driven component.

The former component, viz. ocean currents, whether geostrophic or tidal in origin, is a phenomenon embracing motion of the water mass relative to land. The direction and speed of such motions are, under most circumstances, nearly independent of the local surface wind.

It is the latter component which typically is much greater than the current component, as evidenced by the existence of wavelets, ripples, droplets and foam, for which the present invention affords a correction.

Although the preferred embodiment described above utilizes the relationship wherein $s/s' \approx \delta/\delta' \approx R$, a constant, it is to be appreciated that within the scope of the invention $s/s'$ and $\delta/\delta'$ need not be equal to the same constant R. In fact, subsequent flight tests, utilizing different Doppler system configurations, may very well result in a finding that the relationships between $s$ and $s'$ and between $\delta$ and $\delta'$ are expressable as different functions, for example as quadratic or other higher order equations. Having determined these relationships it would be a straightforward thing to formulate new expressions for V and $\alpha$ which would then be implemented in a manner similar to that described in FIG. 3 and 4 or 7.

While the above discussion has been directed towards describing the application of the invention to a stabilized antenna system, such as that described in U.S. Pat. No. 3,134,102, it will be apparent to those skilled in the art that within the scope of the invention modifications to the electronic circuitry, as depicted in FIG. 3 and 4 or 7, can be made which will adapt the invention disclosed herein to fixed or non-stabilized antenna systems or to systems stabilized in a different fashion from our example. In a fixed antenna system any two horizontal components of the aircraft's velocity, for example, the "along-heading" and "cross-heading" components, are measured and manipulated to give the aircraft's velocity, i.e., its speed and drift angle. By providing a Doppler system with two modes of operation whose characteristics vary between modes in a manner similar to that described for the stabilized system configuration, values for each component of velocity can be obtained which are corrected for the wind driven component of water motion. Equations similar to equation 16 for each component of velocity are readily derivable and implemented in a manner similar to that depicted in FIG. 3 and 4 or 7.

Although the preceding disclosure discussed implementation utilizing analog techniques it is readily apparent to one skilled in the art that appropriate digital techniques could be employed to effect the same results.

Of course, other variations of the specific construction and arrangement of the assembly disclosed above can be made by those skilled in the art without departing from the invention as defined in the appended claims.

What is claimed is:

1. Apparatus for determining the speed V of an aircraft above water with respect to ground, comprising:
   A. a first radar means for providing a value $V_o$ indicative of the speed of the aircraft with respect to water wherein said value $V_o$ contains a contribution $s$ due to a water motion effect;
   B. a second radar means for providing a value $V_o'$ indicative of the speed of the aircraft with respect to water wherein said value $V_o'$ contains a contribution $s'$ due to the water motion effect, wherein $s'$ is known function of $s$; and Cz means for calculating the speed V from the values $V_o$ and $V_o'$ based upon the known function of $s$ with respect to $s'$.

2. Apparatus for determining the drift angle $\alpha$ of an aircraft above water with respect to ground, comprising:
   A. a first radar means for providing a value $\alpha_o$ indicative of the drift angle of the aircraft with respect to water wherein said value $\alpha_o$ contains a contribution $\delta$ due to a water motion effect;
   B. a second radar means for providing a value $\alpha'_o$ indicative of the drift angle of the aircraft with respect to water wherein said value $\alpha'_o$ contains a contribution $\delta'$ due to the water motion effect, wherein $\delta'$ is a known function of $\delta$; and
   C. means for calculating the drift angle $\alpha$ from the values $\alpha_o$ and $\alpha'_o$ based upon the known function $\delta$ with respect to $\delta'$.

3. Apparatus for determining the speed V and the drift angle $\alpha$ of an aircraft above water with respect to ground, comprising:
   A. a first radar means for providing a value $V_o$ and a value $\alpha_o$ indicative of the speed and drift angle, respectively, of the aircraft with respect to water wherein said values $V_o$ and $\alpha_o$ contain contributions $s$ and $\delta$, respectively, due to a water motion effect;
   B. a second radar means for providing a value $V_o'$ and a value $\alpha_o'$ indicative of the speed and drift angle, respectively, of the aircraft with respect to water wherein said values $V_o'$ and $\alpha_o'$ contain contributions $s'$ a known function of $s$, and $\delta'$, a known function of $\delta$; and
   C. means for calculating the speed V and the drift angle $\alpha$ from the values $V_o$ and $V_o'$ and $\alpha_o$ and $\alpha_o'$, respectively, based upon the known functions of $s'$ with respect to $s$ and $\delta'$ with respect to $\delta$.

4. Apparatus for determining the speed V and the drift angle $\alpha$ of an aircraft above water with respect to ground, comprising:
   A. means for transmitting electromagnetic energy from said aircraft toward the water below;
   B. means, having certain characteristics, for receiving electromagnetic energy reflected from the water below;
   C. means, having at least one characteristic different from those of (B) above, for receiving electromagnetic energy reflected from the water below;
   D. means coupled to said means (B) for producing a signal indicative of an apparent speed $V_o$ wherein $V_o=V(1+\epsilon)+s$ wherein $\epsilon$ is a calculable fixed function of sea state termed "over water shift" and $s$ is a water motion variable dependent upon sea state, and for producing a signal indicative of apparent drift angle $\alpha_o$ wherein $\alpha_o=\alpha+\delta$ wherein $\delta$ is a water motion variable dependent upon sea state;
   E. means coupled to said means (C) for producing a signal indicative of an apparent speed $V_o'$ wherein $V_o' = V(1+\epsilon')+s'$ wherein $\epsilon'$ is a calculable fixed function of sea state termed "over water shift" and $s'$ is a water motion variable dependent upon sea state, and for producing a signal indicative of apparent drift angle $\alpha_o'$ wherein $\alpha_o'=\alpha+\delta'$ wherein $\delta'$ is a water motion variable dependent upon sea state; and wherein $s$ is a known function of $s'$, and $\delta$ is a known function of $\delta'$;
   F. means coupled to said means (D) and (E) for receiving the signals $V_o$ and $V_o'$ and for producing a signal indicative of the speed V; and
   G. means coupled to said means (D) and (E) for receiving the signals $\alpha_o$ and $\alpha_o'$ and for producing a signal indicative of the drift angle $\alpha$.

5. Apparatus as recited in claim 4 wherein said characteristics are selected from the group consisting of frequency transmitted; direction of polarization of energy received; and gamma angle of energy received.

6. Apparatus as recited in claim 4 wherein said means (B) includes an antenna for receiving horizontally polarized energy; and said means (C) includes an antenna for receiving vertically polarized energy.

7. Apparatus as recited in claim 4 wherein said means (B) receives energy at frequencies different from said means (C).

8. Apparatus as recited in claim 4 wherein said means (B) is directed at a different "looking angle" to the water below than said means (C).

9. Apparatus as recited in claim 4 wherein said means (B) and (C) are sequentially operable.

10. Apparatus as recited in claim 4 wherein said means (B) and (C) are simultaneously operable.

11. Apparatus for determining a first and second component of velocity V of an aircraft, above water, with respect to land comprising:
   A. means for transmitting electromagnetic energy from said aircraft toward the water below;
   B. means, having certain characteristics, for receiving electromagnetic energy reflected from the water below;
   C. means, having at least one characteristic different from those of (B) above, for receiving electromagnetic energy reflected from the water below;
   D. means coupled to said means (B) for producing a first signal indicative of an apparent first component of aircraft velocity wherein said first component is functionally dependent upon sea state, and for further producing a second signal apparently indicative of a second component of aircraft velocity wherein said second component is functionally dependent on sea state;
   E. means coupled to said means (C) for producing a third signal apparently indicateive of the first component of aircraft velocity wherein said first signal is functionally dependent upon sea state, and for further producing a fourth signal apparently indicative of the second component of aircraft velocity wherein said second component is functionally dependent on sea state;
   F. means coupled to said means (D) and (E) for receiving the first and third signals and for producing a signal truly indicative of the first component of velocity; and
   G. means coupled to said means (D) and (E) for receiving the second and fourth signals and for producing a signal truly indicative of the second component of velocity.

12. A method of determining the velocity of an aircraft above water with respect to the land, comprising the steps:
   A. transmitting electromagnetic energy from said aircraft to the water below;
   B. receiving electromagnetic energy reflected from the water below, by means of an electronic means having certain characteristics, and producing a signal, by virtue of the Doppler effect, indicative of an apparent speed $V_o$ wherein $V_o = V(1+\epsilon) + s$ whereby $\epsilon$ is a calculable fixed function of sea state known as the "over water shift" and s is a function of sea state;

C. receiving electromagnetic energy reflected from the water below, by means of electronic means having at least one characteristic different from that set forth in (B) above, and producing a signal, by virtue of the Doppler effect, indicative of an apparent velocity $V_o'$ wherein $V_o' = V(1+\epsilon') + s'$ whereby $\epsilon'$ is a calculable fixed function of sea state known as the "over water shift" and $s'$ is a function of sea state, and whereby $s$ bears a known relationship to $s'$; and D. determining the value V from the apparent velocities $V_o$ and $V_o'$.

13. The method as recited in claim 12 wherein in step (B), reflected horizontally polarized signals are received, and in step (C), reflected vertically polarized signals are received.

* * * * *